(12) United States Patent
Tang

(10) Patent No.: US 9,692,932 B2
(45) Date of Patent: Jun. 27, 2017

(54) INFORMATION CONVEYING METHOD AND SYSTEM

(71) Applicant: Shih-Wei Tang, Taichung (TW)

(72) Inventor: Shih-Wei Tang, Taichung (TW)

(*) Notice: Subject to any disclaimer, the term of this patent is extended or adjusted under 35 U.S.C. 154(b) by 57 days.

(21) Appl. No.: 14/817,371

(22) Filed: Aug. 4, 2015

(65) Prior Publication Data
US 2016/0044206 A1    Feb. 11, 2016

(30) Foreign Application Priority Data

Aug. 7, 2014 (TW) ............................. 103127061 A
May 29, 2015 (TW) ............................. 104117427 A

(51) Int. Cl.
*H04N 1/32*   (2006.01)
*G06K 9/62*   (2006.01)
*H04N 1/00*   (2006.01)
*G06K 9/32*   (2006.01)

(52) U.S. Cl.
CPC ..... *H04N 1/32128* (2013.01); *H04N 1/00336* (2013.01); *H04N 2201/328* (2013.01); *H04N 2201/3235* (2013.01); *H04N 2201/3249* (2013.01); *H04N 2201/3253* (2013.01); *H04N 2201/3261* (2013.01); *H04N 2201/3273* (2013.01); *H04N 2201/3274* (2013.01); *H04N 2201/3278* (2013.01)

(58) Field of Classification Search
CPC .......... H04N 1/32128; H04N 1/00336; H04N 2201/3235; H04N 2201/3249; H04N 2201/3253; H04N 2201/3261; H04N 2201/3273; H04N 2201/3274; H04N 2201/3278; H04N 2201/328; G06K 9/6201; G06K 9/6217
See application file for complete search history.

(56) References Cited

U.S. PATENT DOCUMENTS

| 7,627,582 | B1* | 12/2009 | Ershov ............. G06F 17/30864 |
| 8,316,237 | B1* | 11/2012 | Felsher ................. H04L 9/0825 380/282 |
| 9,324,014 | B1* | 4/2016 | Dixon .................... G06F 3/1238 |
| 9,473,490 | B2* | 10/2016 | Clausen ............. H04L 63/0838 |
| 2006/0098642 | A1* | 5/2006 | Mallya ...................... H04J 3/12 370/389 |
| 2006/0120607 | A1* | 6/2006 | Lev .................... G06K 9/00624 382/217 |
| 2007/0118853 | A1* | 5/2007 | Kreitzer ........... H04L 29/06027 725/46 |

(Continued)

*Primary Examiner* — Kim Vu
*Assistant Examiner* — Pinalben Patel
(74) *Attorney, Agent, or Firm* — Trop Pruner & Hu, P.C.

(57) ABSTRACT

An information conveying method is implemented by an information conveying system coupled to a first electronic device associated with a service provider and a second electronic device associated with a user. The system is programmed to: receive a reference image; create a data packet based, on to-be-conveyed information associated with the service provider, and link the data packet to the reference image; upon receiving a captured image from the second electronic device, generate a characteristic code of the captured image; determine whether the captured image matches the reference image; and when the determination made is affirmative, transmit the data packet to the second electronic device.

16 Claims, 9 Drawing Sheets

(56) References Cited

U.S. PATENT DOCUMENTS

| | | | |
|---|---|---|---|
| 2008/0031542 A1* | 2/2008 | Lei | G06K 9/6202 |
| | | | 382/283 |
| 2008/0098450 A1* | 4/2008 | Wu | H04N 21/4312 |
| | | | 725/132 |
| 2008/0184375 A1* | 7/2008 | Nonaka | G06F 21/6245 |
| | | | 726/27 |
| 2009/0100050 A1* | 4/2009 | Erol | G06F 17/30026 |
| 2009/0183199 A1* | 7/2009 | Stafford | H04H 60/375 |
| | | | 725/34 |
| 2009/0228707 A1* | 9/2009 | Linsky | G06F 21/31 |
| | | | 713/171 |
| 2009/0251457 A1* | 10/2009 | Walker | G06T 17/10 |
| | | | 345/418 |
| 2010/0211861 A1* | 8/2010 | Onda | H04L 63/1441 |
| | | | 715/205 |
| 2012/0005222 A1* | 1/2012 | Bhagwan | G06F 17/30389 |
| | | | 707/769 |
| 2012/0208592 A1* | 8/2012 | Davis | H04W 4/001 |
| | | | 455/556.1 |
| 2013/0275486 A1* | 10/2013 | Dickinson | H04L 67/10 |
| | | | 709/201 |
| 2013/0287256 A1* | 10/2013 | Narasimha | G06K 9/6201 |
| | | | 382/103 |
| 2014/0046837 A1* | 2/2014 | Metral | G06Q 40/02 |
| | | | 705/41 |
| 2015/0010228 A1* | 1/2015 | Rogers | G06K 9/00536 |
| | | | 382/141 |
| 2015/0095999 A1* | 4/2015 | Toth | H04L 63/08 |
| | | | 726/6 |

\* cited by examiner

INFORMATION CONVEYING METHOD AND SYSTEM

CROSS-REFERENCE TO RELATED APPLICATION

This application claims priorities of Taiwanese Patent application No. 103127061 filed on Aug. 7, 2014, and Taiwanese Patent Application No. 104117427, filed on May 29, 2015.

FIELD

The disclosure relates to a method for conveying information, and a system for implementing the method.

BACKGROUND

A conventional way to obtain information pertaining to a particular subject may involve keyword searching. However, coming up with an accurate keyword may sometimes be somewhat difficult.

A barcode (e.g., a quick response code) containing a link may be provided by a service provider to convey particular information. A user may operate a mobile device to "read" the barcode in order to obtain the information via the link contained in the barcode.

However, the implementation of barcode may not be aesthetically desirable. Secondly, the capacity of a barcode (i.e., an amount of data that can be carried by the barcode) is limited, and when it is intended to update the information to be conveyed thereby (e.g., a link to a new website), the entire barcode needs to be changed. Moreover, the barcode may contain only one link (to a particular website), and may be ineffective when more information from additional sources is to be conveyed.

SUMMARY

Therefore, an object of the disclosure is to provide a method that can alleviate at least one of the drawbacks of the prior arts.

According to the disclosure, the information conveying method is for conveying information, and is to be implemented by an information conveying system in cooperation with a first electronic device and a second electronic device. The first electronic device is associated with a service provider. The second electronic device is associated with a user. The method includes the steps of:

receiving at least one reference image assigned by the first electronic device;

creating a data packet based on to-be-conveyed information associated with the service provider, and linking the data packet to the at least one reference image;

upon receiving a captured image from the second electronic device, generating a characteristic code of the captured image according to features of the captured image;

determining whether there is a match for the captured image among the at least one reference image according to the characteristic code of the captured image; and when the determination is affirmative, transmitting the data packet, which is linked to the at least one reference image, to the second electronic device.

Another object of the disclosure is to provide an information conveying system that is for implementing the aforementioned information conveying method.

According to the disclosure, the information conveying system is able to be coupled to a first electronic device and a second electronic device. The first electronic device is associated with a service provider. The second electronic device is associated with a user. The information conveying system includes a communication unit that is able to communicate with the first electronic device and the second electronic device, and a processing module that is coupled to the communication unit.

Upon the communication unit receiving at least one reference image assigned by the first electronic device, the processing module is programmed to create a data packet based on to-be-conveyed information associated with the service provider, and to link the data packet to the at least one reference image.

Upon the communication unit receiving a captured image from the second electronic device, the processing module is programmed to generate a characteristic code of the captured image according to features of the captured image, and to determine whether there is a match for the captured image among the at least one reference image according to the characteristic code of the captured image.

When the determination is affirmative, the processing module is programmed to transmit the data packet, which is linked to the at least one reference image, to the second electronic device via the communication unit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
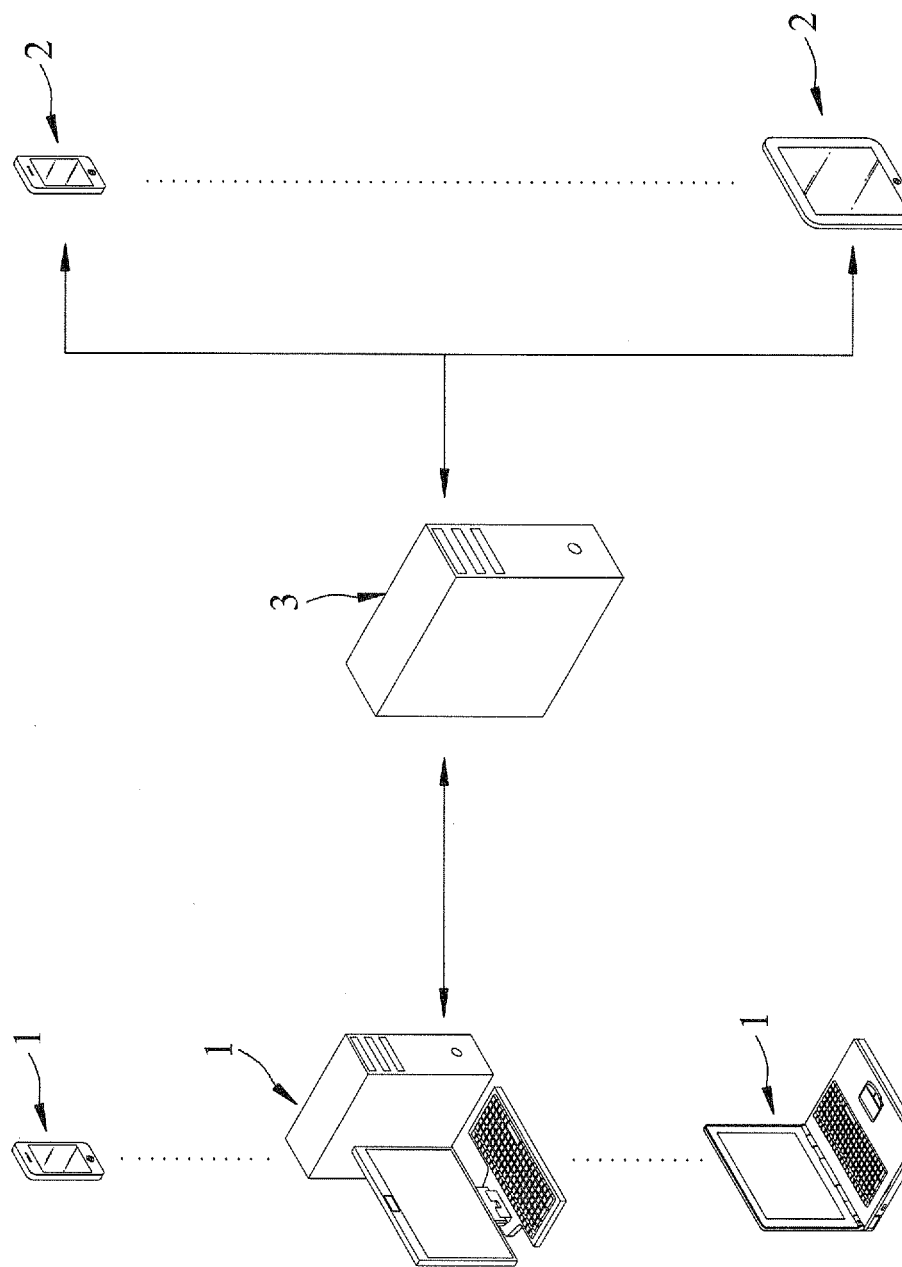
FIG. 1 illustrates an information conveying system operating in cooperation with at least one first electronic device and at least one second electronic device according to an embodiment of the disclosure.
Figure 2:
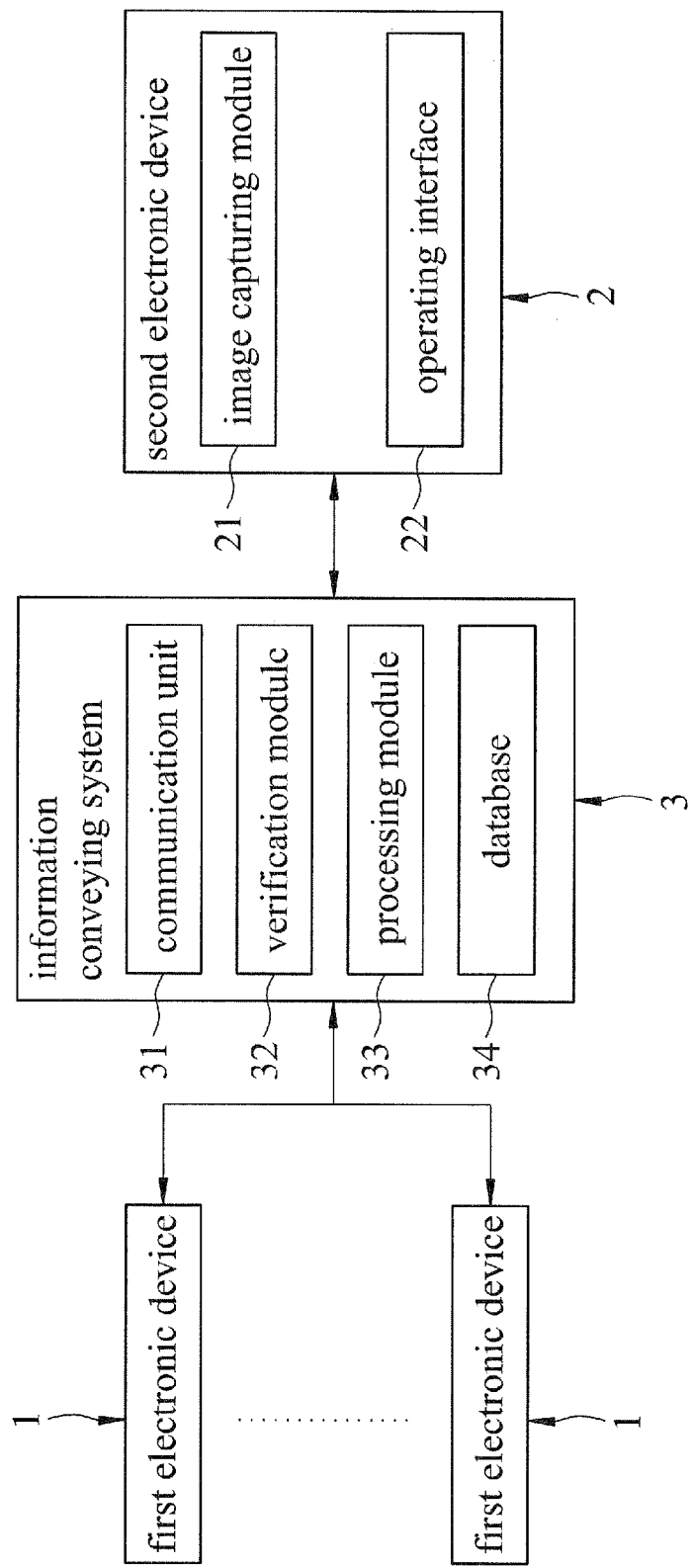
FIG. 2 is a block diagram illustrating the information conveying system being coupled to the at least one first electronic device and the at least one second electronic device.

FIG. 1 illustrates an information conveying system 3 according to an embodiment of the disclosure. The information conveying system 3 may be coupled to at least one first electronic device 1 and at least one second electronic device 2. The first electronic device 1 is associated with a service provider 41 (see FIG. 3), and may be embodied using an electronic device such as a desktop computer, a laptop computer, a tablet computer, a mobile device, etc. The second electronic device 2 is associated with a user 5 (see FIG. 3), and may be similarly embodied using an electronic device such as a tablet computer, a mobile device, etc. Referring to FIG. 2, the second electronic device 2 includes an image capturing module 21 (e.g., a camera) and an operating interface 22, e.g., a touch screen.

In this embodiment, the information conveying system 3 is embodied using a host server that includes a communication unit 31, a verification module 32, a processing module 33 and a database 34. The database 34 may store a software application that, when executed by the processing module 33, causes the processing module 33 to perform actions as described below.

Before being allowed to communicate with the information conveying system 3, the first electronic devices 1 is required to transmit a provider certificate to the information conveying system 3. This provider certificate may include a combination of a name and a password. Upon receipt of the provider certificate, the verification module 32 is programmed to verify the provider certificate.

When it is determined that the provider certificate from the first electronic device 1 is authentic, the verification module 32 adds the service provider 41 to a registered-provider group 4.

The first electronic device 1 that provides the authenticated provider certificate will be allowed to assign at least one reference image 61 for the information conveying system 3. The "assignment" of the reference image 61 may be done by the first electronic device 1 uploading an image to the information conveying system 3 via the Internet and designating the image as the reference image 61. Alternatively, the first electronic device 1 may select an image pre-stored in the database 34 to serve as the reference image 61.

Furthermore, the first electronic device 1 is allowed to assign certain to-be-conveyed information 62 that is to be associated with the reference image 61. Similar to the assignment of the reference image 61, the first electronic device 1 may upload the desired information to the information conveying system 3 via the Internet and designating the information as the to-be-conveyed information 62. Alternatively, the first electronic device 1 may select certain information pre-stored in the database 34 to serve as the to-be-conveyed information 62.

The first electronic device 1 has authority over the reference image 61 and the to-be-conveyed information 62. In response to the assignments of the reference image 61 and the to-be-conveyed information 62, the processing module 33 is programmed to create a data packet 62' that includes the to-be-conveyed information 62 thus assigned. The processing module 33 is also programmed to link the reference image 61 and the data packet 62'.

Afterward, when a captured image 63, which matches the reference image 61, is received from the second electronic device 2, the information conveying system 3 is programmed to transmit the data packet 62' to the second electronic device 2.

In order to determine whether the captured image 63 matches the reference image 61, the information conveying system 3 may be programmed to generate a characteristic code of the captured image 63 according to features of the captured image 63, upon receiving the captured image 63 from the second electronic device 2. Afterward, the information conveying system 3 is able to determine whether the captured image 63 matches the reference image 61 according to the characteristic code of the captured image 63.

Figure 3:
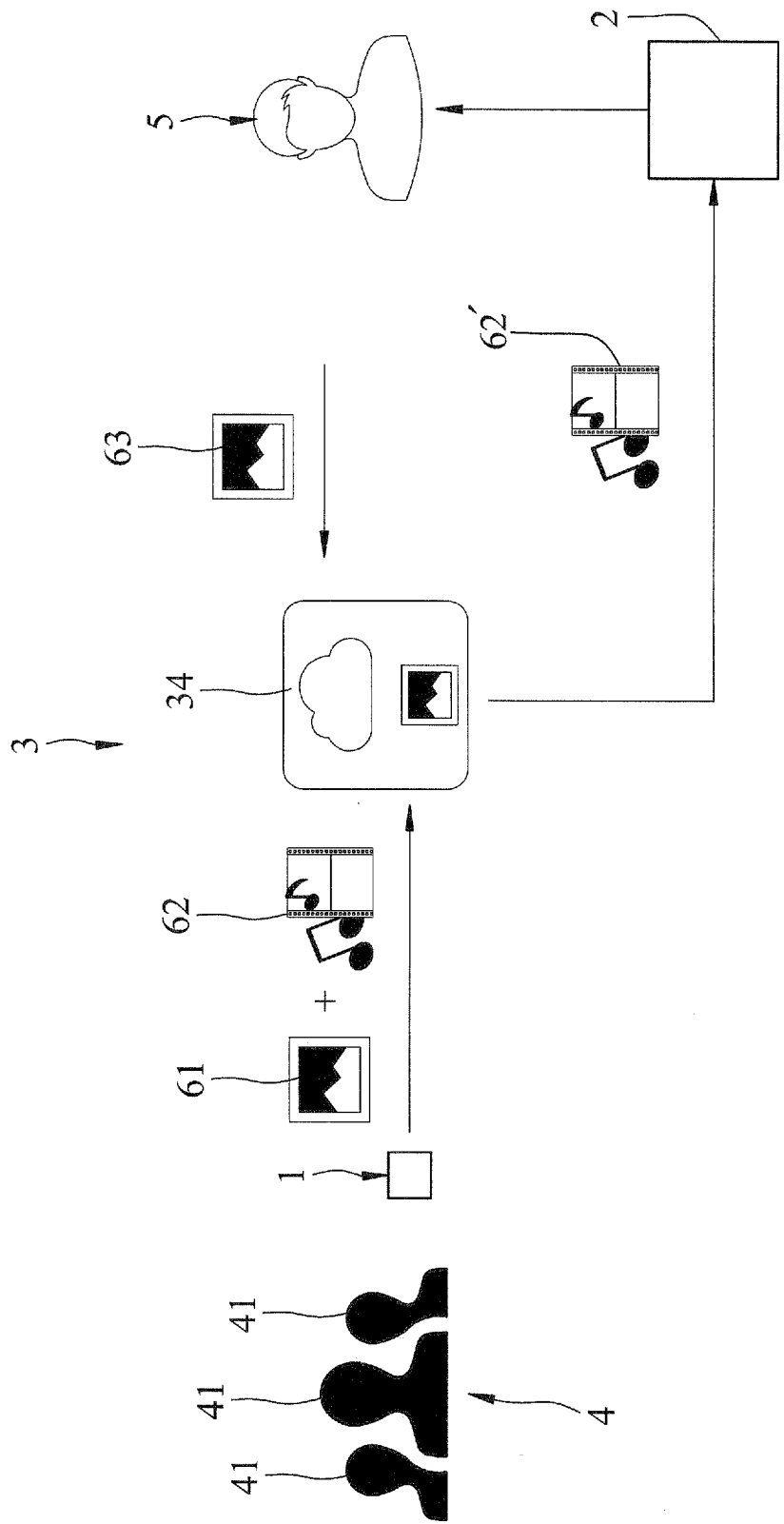
FIG. 3 illustrates interactions among a service provider with which one of the first electronic devices is associated, a user with which one of the second electronic devices is associated, and the information conveying system.

Referring to FIG. 3, in practice, when the user 5 of the second electronic device 2 captures an image 63 and transmits the captured image 63 to the information conveying system 3, the information conveying system 3 first determines whether the captured image 63 matches the reference image 61 assigned by the service provider 41 via the first electronic device 1. When the determination is affirmative, the information conveying system 3 transmits the data packet 62', which includes the information assigned by the service provider 41, back to the second electronic device 2.

In this way, the user 5 employs the captured image 63, instead of a keyword string, to locate relevant information. For example, the user 5 may capture an image of a commercial advertisement provided by the service provider 41 (e.g., a snapshot of a commercial video or a logo on a poster). When such an image is transmitted from the second electronic device 2 to the information conveying system 3, the information conveying system 3 may provide the associated information, in the form of the data packet 62', to the second electronic device 2.

The data packet 62' may include at least one of an image, a video, an animation, a webpage, a text file and a hyperlink.

In this embodiment, the information conveying system 3 is coupled to a plurality of first electronic devices 1 (see FIG. 1 and FIG. 2), which are associated with different service providers 41, respectively. With each first electronic device 1 being operated to assign a reference image 61 and a piece of to-be-conveyed information, the information conveying system 3 thereby receives multiple pieces of to-be-conveyed information 62 from the first electronic devices 1. In some cases, multiple data packets 62' are created to respectively include the multiple pieces of to-be-conveyed information 62 and each data packet 62' is linked to a respective reference image 61. In some cases, upon receiving authorization from a subgroup of the first electronic devices 1 (or the associated service providers 41), a single data packet 62' may be created using multiple pieces of to-be-conveyed information assigned by the subgroup of the first electronic devices 1, where this sole data packet 62' may be linked to a single reference image 61 the associated service providers 41 had agreed upon, or may be linked to a plurality of reference images 61, each assigned by a respective one of the first electronic devices 1. In some embodiments, the first electronic device 1 may authorize the information conveying system 3 to prepare and create a piece of information on behalf of the service provider 41 so as to serve as the to-be-broadcasted information 62 to be associated with the reference image 61 that is assigned by the service provider 41.

In the case where a data packet 62' includes multiple pieces of to-be-conveyed information 62 from different ones of the first electronic devices 1, the multiple pieces of to-be-conveyed information 62 included are categorized according to types of service provided by the associated service providers 41 (e.g., a restaurant, a hotel, etc.). As a result, when the second electronic device 2 receives this data packet 62', a menu bar may be provided on the operating interface 22 in order to allow the user 5 to access the separately categorized to-be-conveyed information 62.

Figure 4:
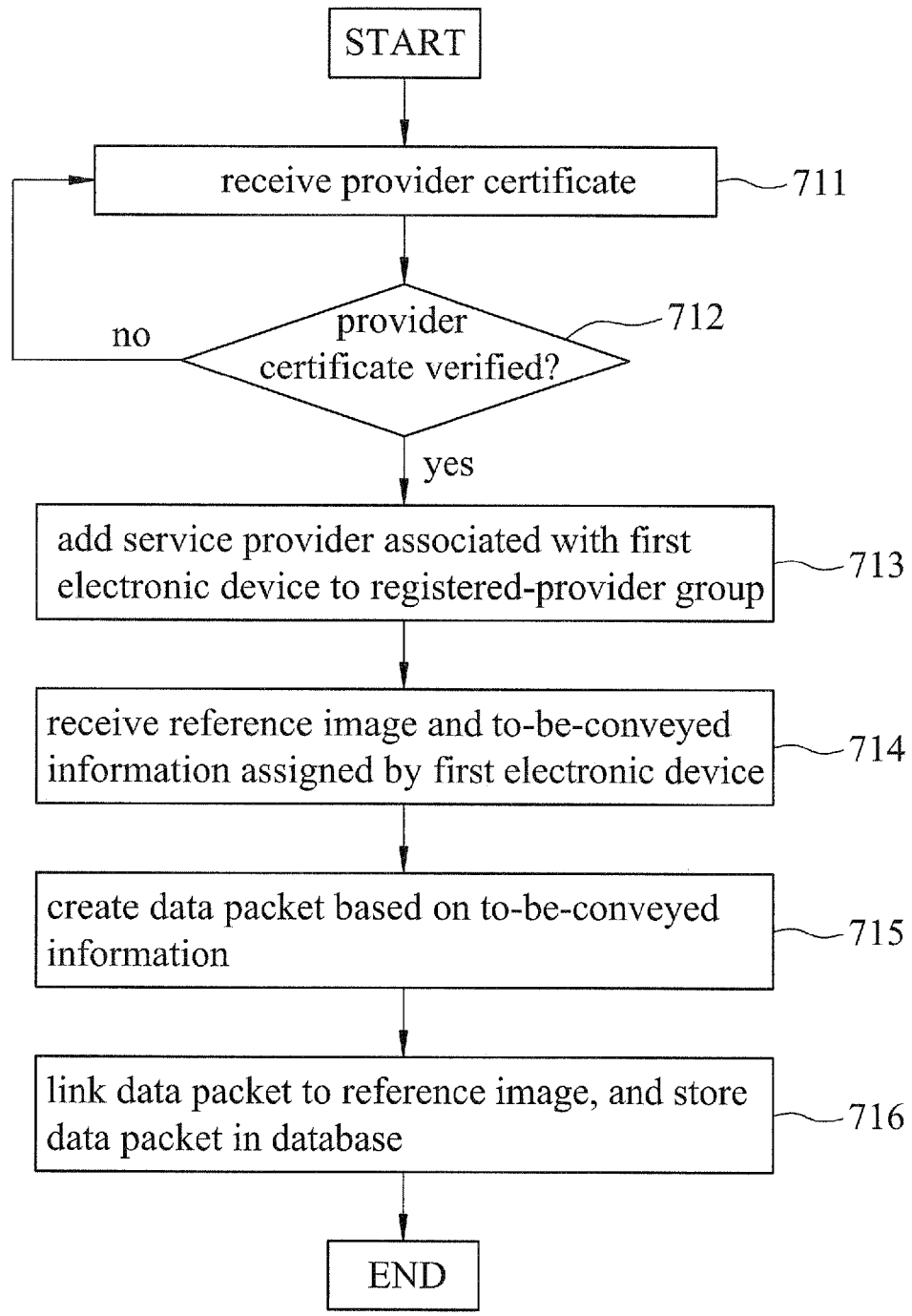
FIG. 4 is a flowchart illustrating steps of a setup process between the first electronic device and the information conveying system.

FIG. 4 is a flowchart illustrating steps of a setup process between the first electronic device 1 and the information conveying system 3 according to an exemplary embodiment.

In step 711, the information conveying system 3 receives a provider certificate from the first electronic device 1. The information conveying system 3 then verifies the provider certificate in step 712. When the provider certificate is determined to be authentic, the flow proceeds to step 713. Otherwise, the flow goes back to step 711.

In step 713, the information conveying system 3 adds the service provider 41 with which the first electronic device 1 is associated to the registered-provider group 4.

In step 714, the information conveying system 3 receives the reference image 61 and the to-be-conveyed information 62 assigned by the first electronic device 1. Each of the reference image 61 and the to-be-conveyed information 62 may be uploaded by the first electronic device 1, or may be pre-stored in the database 34 and selected by the first electronic device 1.

In step 715, the information conveying system 3 creates the data packet 62' based on the to-be-conveyed information 62 assigned by and associated with the service provider 41.

In step 716, the conveying system 3 links the data packet 62' to the reference image 61, and stores the reference image 61 and the data packet 62' in the database 34.

After the setup process is completed, the information conveying system 3 is ready to interact with the second electronic device 2. The second electronic device 2 may store a user-end application that, when executed by a processor of the second electronic device 2, causes the second electronic device 2 to interact with the information conveying system 3.

Figure 5:
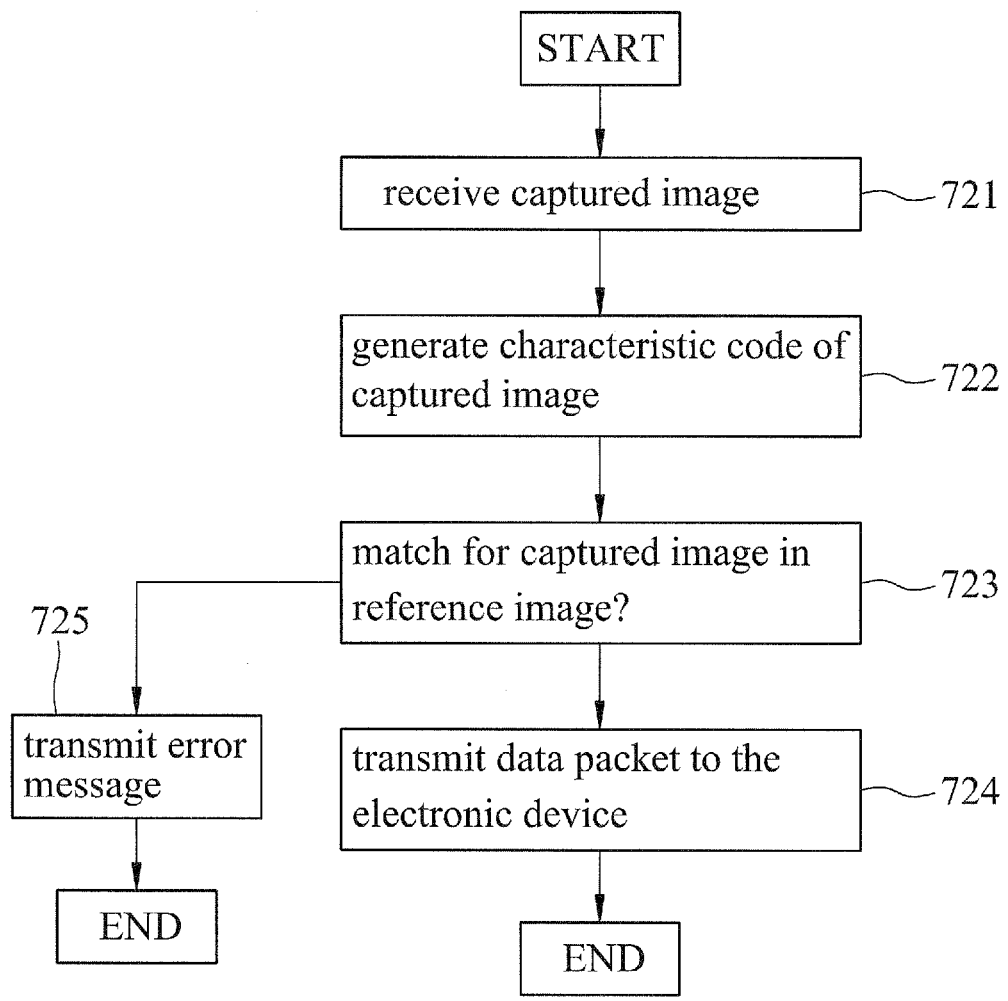
FIG. 5 is a flowchart illustrating steps of an information conveying process between the second electronic device and the information conveying system.

FIG. 5 is a flow chart illustrating an information conveying process between the second electronic device 2 and the information conveying system 3. It is noted that the information conveying system 3 may have undergone the setup process with a plurality of first electronic devices 1 respectively associated with a plurality of service providers 41, and thus the database 34 stores a plurality of reference images 61 and one or more pieces of the to-be-conveyed information 62.

In step 721, the information conveying system 3 receives the captured image 63 from the second electronic device 2. The captured image 63 may be captured by the image capturing module 21 of the second electronic device 2 from an image provided in the form of a logo and displayed at a particular site (on a sign, in a poster, in a publication, etc.).

In step 722, the information conveying system 3 generates a characteristic code of the captured image 63, according to features of the captured image 63.

In step 723, the information conveying system 3 determines whether there is a match for the captured image 63 in the database 34 among the reference images 61 according to the characteristic code of the captured image 63. When such a match is found, i.e., when the captured image 63 matches one of the reference images 61, the flow proceeds to step 724. Otherwise, the flow proceeds to step 725.

In step 724, the information conveying system 3 transmits the data packet 62', which is linked to the matched one of the reference images 61, to the second electronic device 2.

In step 725, the information conveying system 3 may transmit an error message to the second electronic device 2, notifying the second electronic device 2 that no match is found, and the information conveying process is terminated.

After the second electronic device 2 captures an image (e.g., a logo of the SunMoon Lake (see FIG. 6) provided by the Tourism Bureau of Taiwan, which serves as the service provider 41), which serves as the captured image 63, the second electronic device 2 may interact with the information conveying system 3 in the information conveying process and receive the relevant/associated data packet 62' as a result.

Figure 6:
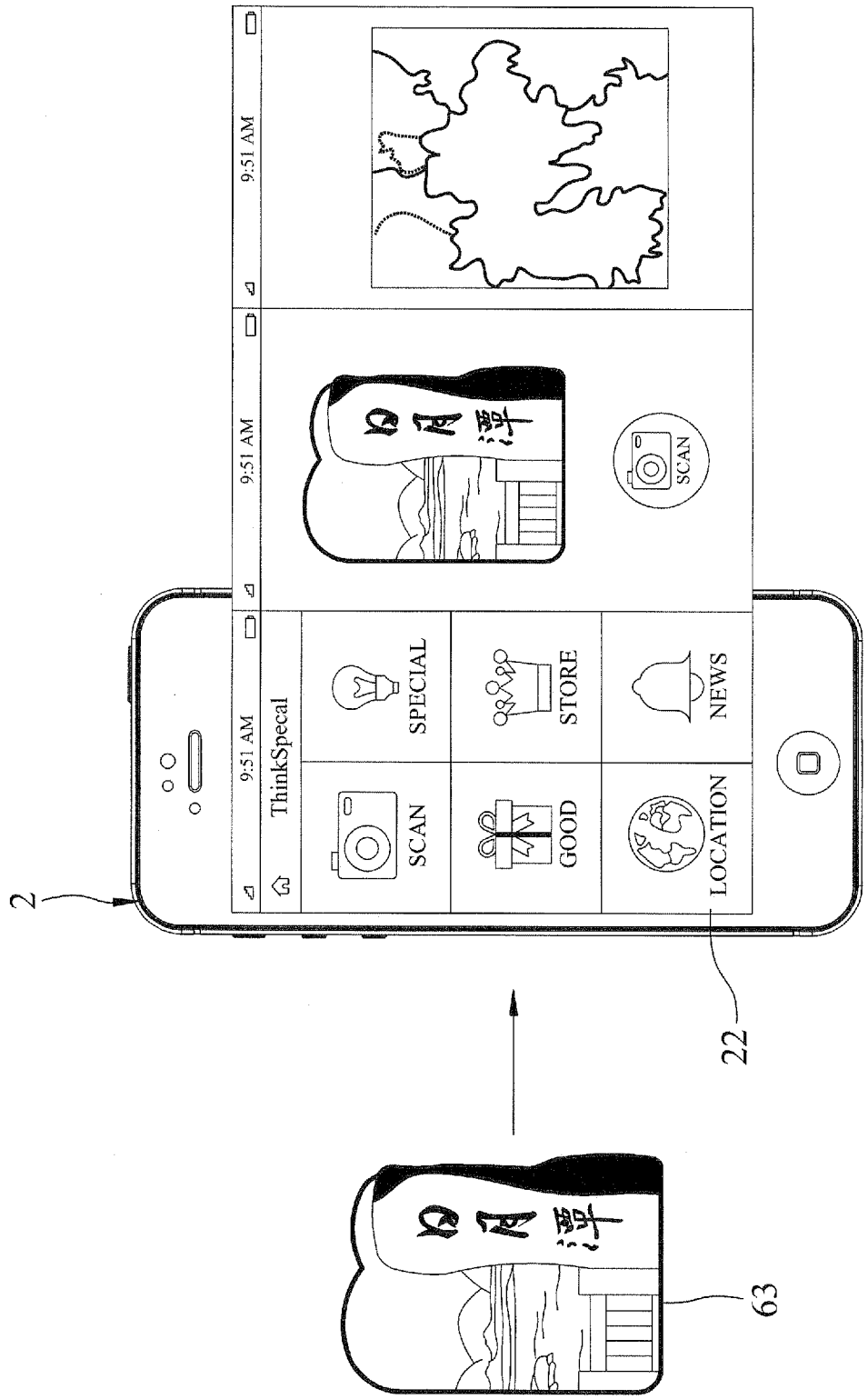
FIGS. 6 to 9 illustrate examples of a data packet transmitted by the information conveying system to the second electronic device.

FIG. 6 is an illustration depicting the second electronic device 2 acquiring the to-be-conveyed information 62 from the captioned image 63 of the logo of the Sun Moon Lake. The to-be-conveyed information included in the data packet 62' received by the second electronic device 2 is displayed on the operating interface 22 and may include a map of the Sun Moon Lake.

Figure 7:
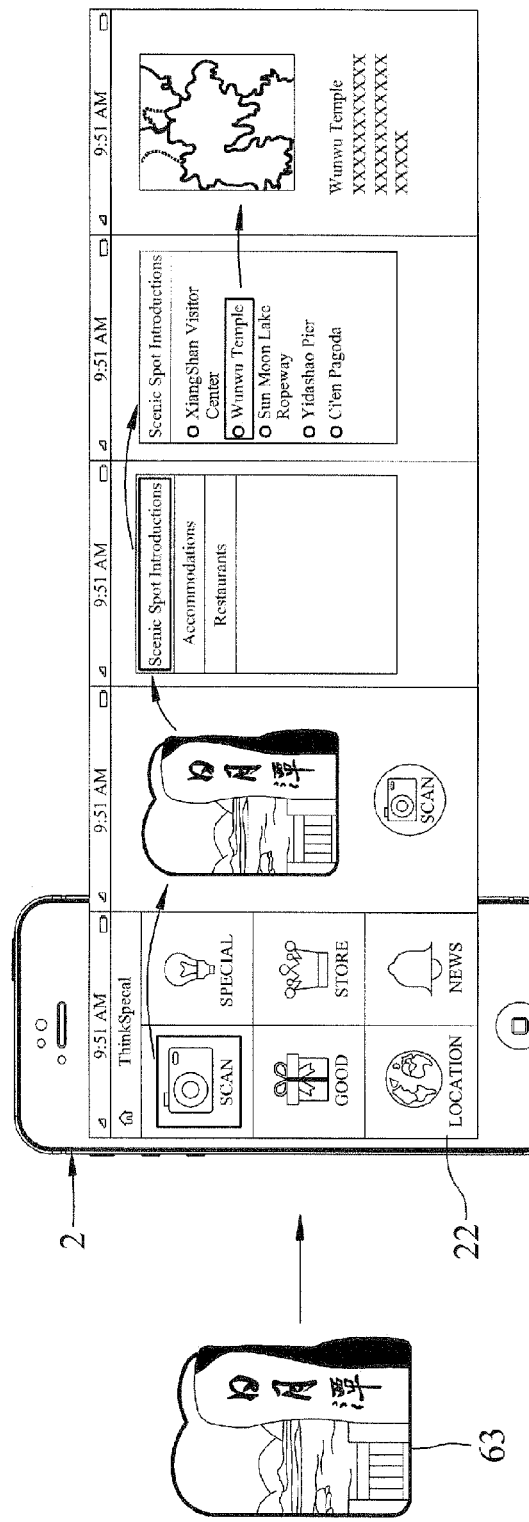

FIG. 7 is an illustration depicting another example data packet 62' that includes multiple pieces of to-be-conveyed information 62 that are categorized. In this example, the data packet 62' includes a list of scenic spot introductions in the area surrounding the Sun Moon Lake, a list of accommodations in the area surrounding the Sun Moon Lake, and a list of restaurants in the area surrounding the Sun Moon Lake. In the depicted example, the user operates the user interface 22 of the second electronic device 2 to view the list of scenic spot introductions and select "Wunwu Temple", and accordingly a map and relevant description are displayed on the second electronic device 2.

It is noted that, in the example shown in FIG. 7, a plurality of service providers 41 (e.g., the Tourism Bureau of Taiwan, hotels/accommodation providers, restaurants, etc.) in the registered-provider group 4 assign the same reference image 61. This reference image 61 may be displayed in the area surrounding of the Sun Moon Lake such that a user located in the area is able to capture the reference image 61 using the second electronic device 2 in order to obtain access of the data packet 62' containing information associated with all these service providers 41 at once.

Figure 8:
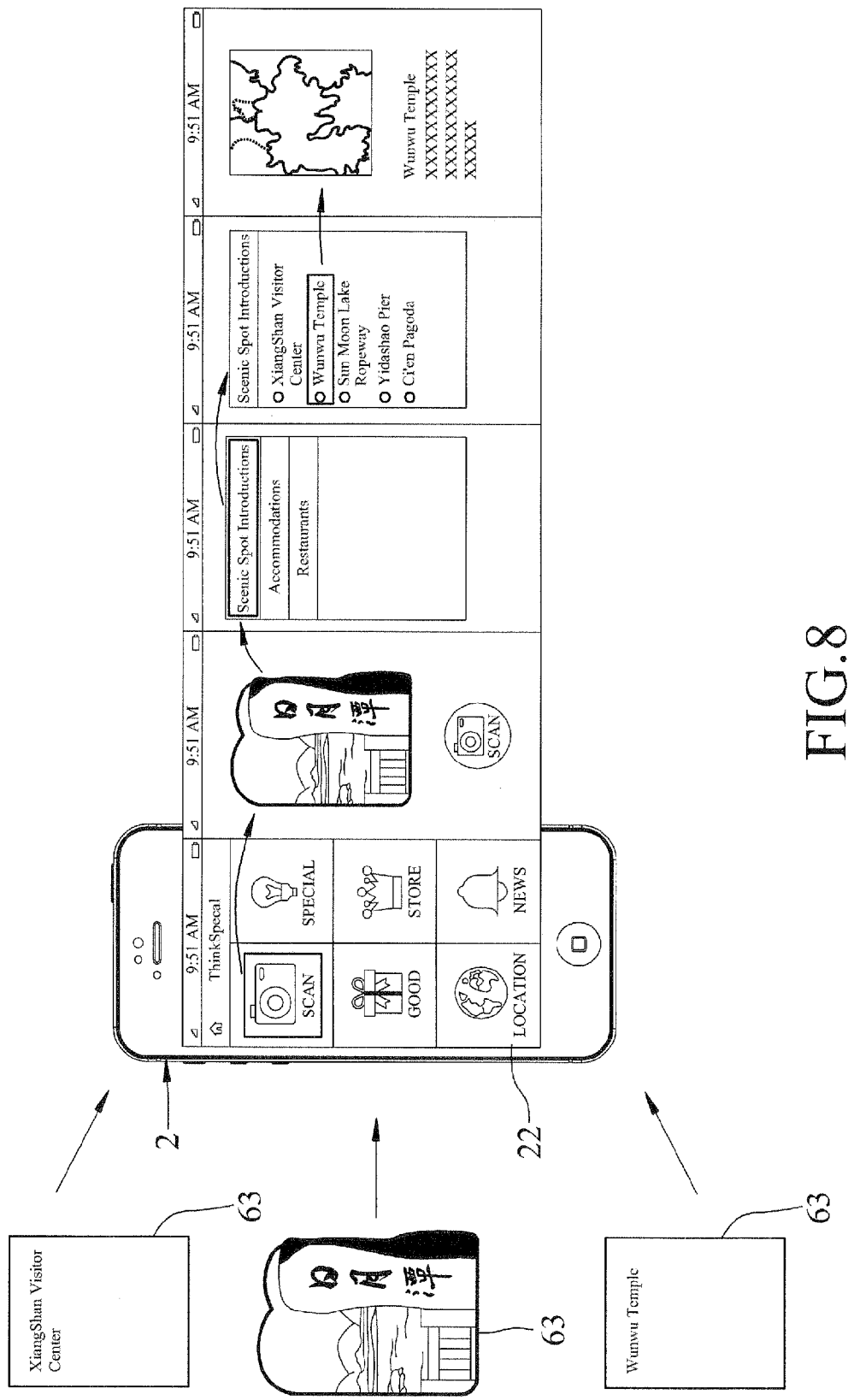

In another embodiment, as shown in FIG. 8, each of the plurality of service providers 41 in the registered-provider group 4 may assign a distinct reference image 61 associated therewith. In creating the data packet 62', the information conveying system 3 may incorporate multiple pieces of to-be-conveyed information assigned by the service providers 41, and link the data packet 62' to each of the reference images 61.

In this way, the service providers 41 may display their own reference images 61 for the user, and capturing any one of the reference images 61 yields the same result.

Figure 9:
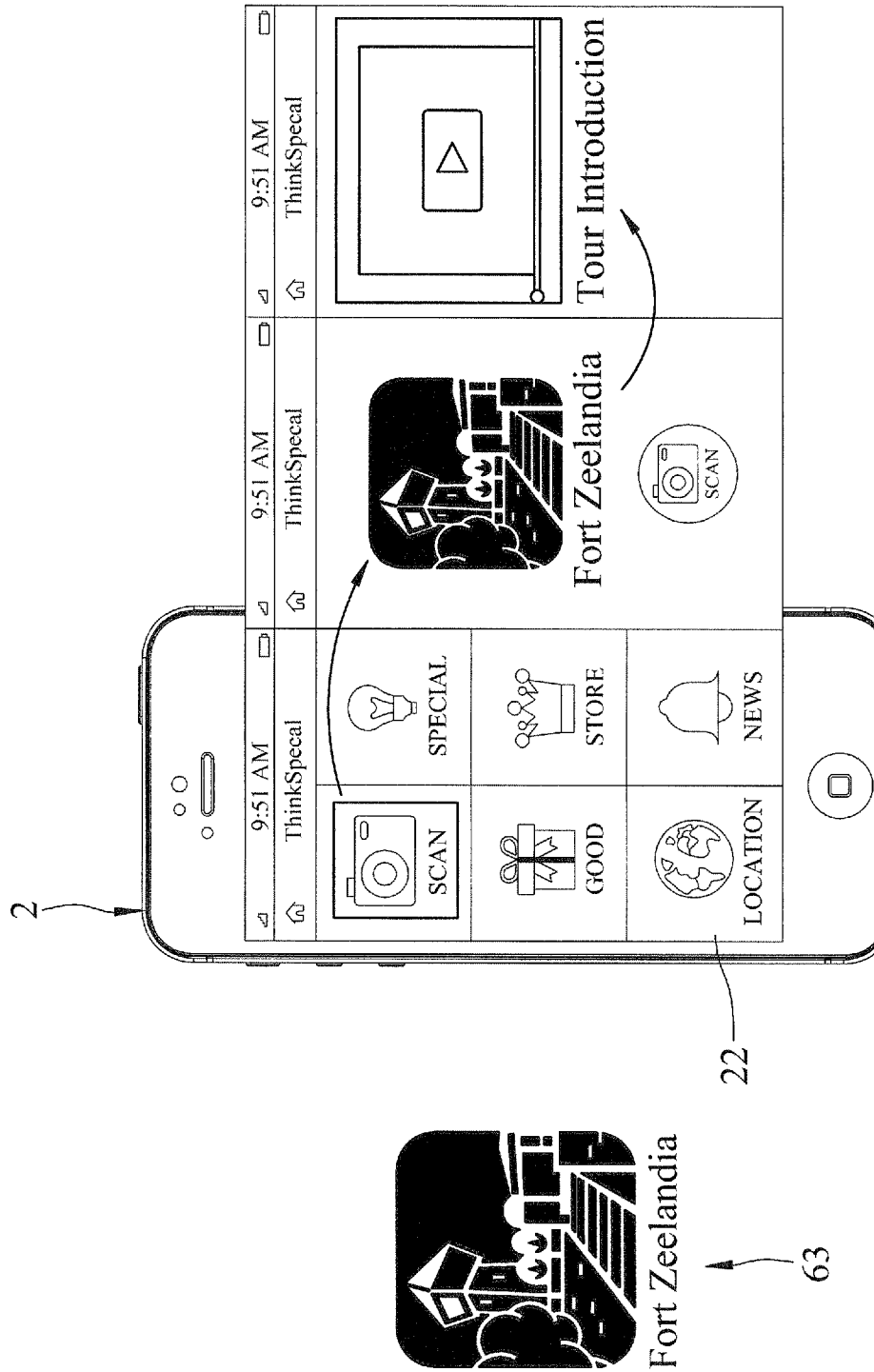

FIG. 9 is an illustration of another example data packet 62' transmitted to the second electronic device 2. In this example, the captured image 63 may include a logo of the Fort Zeelandia provided by the Tourism Bureau of Taiwan. The data packet 62' created by the information conveying system 3 may include a video tour of the Fort Zeelandia and text of tour introduction.

In addition to the above-mentioned effects, the information conveying system 3 may be implemented with other functionalities.

For example, after the data packet 62' for a particular one of the service providers 41 is created, the service provider 41 may be allowed to update the to-be-conveyed information 62 by operating an associated first electronic device 1. In response, the information conveying system 3 is programmed to update the data packet 62', based on the update of the to-be-conveyed information 62.

The information conveying system 3 may also act as a medium for an online transaction between the user 5 and the service providers 41. Specifically, the information conveying system 3 may request a user certificate from the second electronic device 2 operated by the user 5. In response to receipt of a user certificate from the second electronic device 2 (the user certificate may include a name and a password), the information conveying system 3 enables an online transaction between the user 5 corresponding to the user certificate and each of the service providers 41 (e.g., ordering a merchandise, booking a hotel, etc.).

In another example, the processing module 33 of the information conveying system 3 may control the communication unit 31 to forward a sponsor message, which is provided by one of the service providers 1, to all the second electronic devices 2 connected to the information conveying system 3.

To sum up, the embodiments of the disclosure achieve the following effects:

1. The information conveying system 3 employs the captured image 63 for the information conveying process, such that the user 5 is only required to capture an image using the second electronic device 2, and use the captured image 63 as a search criterion instead of a keyword string or a barcode. Moreover, the service providers 41 may provide the to-be-conveyed information to the user 5 without having to use a barcode.

2. The to-be-conveyed information to be linked to the reference image 61 may be updated freely after the setup process, such that the service providers 41 do not need to replace the originally displayed image in order to allow the user 5 to obtain the latest information. For the user 5, using the same captured image 63 for searching always yields the latest information without having to update the user-end application.

3. The information conveying system 3 is able to collect information from a plurality of service providers 41 in the registered-provider group 4, and create the data packet(s) 62' using the information provided by one or more of the service providers 41. In this way, the user 5 is able to gain access to various information from multiple service providers 41 easily, even at once.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An information conveying method to be implemented by an information conveying system in cooperation with a first electronic device and a second electronic device, the first electronic device being associated with a service provider, the second electronic device being associated with a user, the information conveying method comprising the steps of:
   a) receiving at least one reference image assigned by the first electronic device;
   b) creating a data packet based on to-be-conveyed information associated with the service provider, and linking the data packet to the at least one reference image;
   c) upon receiving a captured image from the second electronic device, generating a characteristic code of the captured image according to features of the captured image;
   d) determining whether there is a match for the captured image among the at least one reference image according to the characteristic code of the captured image; and
   e) when the determination made in step d) is affirmative, transmitting the data packet, which is linked to the at least one reference image, to the second electronic device;
   wherein the method further comprises the steps of:
   receiving a provider certificate from the first electronic device; and
   when it is determined that the provider certificate from the first electronic device is authentic, adding the service provider with which the first electronic device is associated to a registered-provider group;
   wherein in step a), the information conveying system receives the reference image assigned by the first electronic device associated with the service provider which is included in the registered-provider group.

2. The information conveying method of claim 1, wherein the data packet created in step b) includes at least one of an image, a video, an animation, a webpage, a text file and a hyperlink.

3. The information conveying method of claim 1, wherein the provider certificate includes an account name and a password specifically associated with the service provider.

4. The information conveying method of claim 1, wherein the to-be-conveyed information is received from the first electronic device.

5. An information conveying method to be implemented by an information conveying system in cooperation with a first electronic device and a second electronic device, the first electronic device being associated with a service provider, the second electronic device being associated with a user, the information conveying method comprising the steps of:
   a) receiving at least one reference image assigned by the first electronic device;
   b) creating a data packet based on to-be-conveyed information associated with the service provider, and linking the data packet to the at least one reference image;
   c) upon receiving a captured image from the second electronic device, generating a characteristic code of the captured image according to features of the captured image;
   d) determining whether there is a match for the captured image among the at least one reference image according to the characteristic code of the captured image; and
   e) when the determination made in step d) is affirmative, transmitting the data packet, which is linked to the at least one reference image, to the second electronic device;
   wherein the to-be-conveyed information is received from the first electronic device, and the method comprises, after step b), the step of:
   in response to the receipt of update of the to-be-conveyed information from the first electronic device, updating the data packet based on the update of the to-be-conveyed information.

6. The information conveying method of claim 4, the information conveying system being coupled to a plurality of first electronic devices which are associated with different service providers, respectively,
   wherein a plurality pieces of the to-be-conveyed information are respectively received from multiple ones of the first electronic devices, and in creating the data packet, the plurality pieces of the to-be-conveyed information from the multiple ones of the first electronic devices are included therein and are categorized according to types of service provided by the service providers.

7. The information conveying method of claim 1, further comprising, after step e), the step of:
   in response to receipt of a user certificate from the second electronic device, enabling an online transaction between the user and the service provider.

8. The information conveying method of claim 1, further comprising the step of:
   forwarding a sponsor message, which is provided by the service provider, to the second electronic device.

9. An information conveying system for conveying information, said information conveying system being able to be coupled to a first electronic device and a second electronic device, the first electronic device being associated with a service provider, the second electronic device being associated with a user, said information conveying system comprising:
  a communication unit that is programmed to communicate with the first electronic device and the second electronic device; and
  a processing module that is coupled to said communication unit;
  wherein:
    upon said communication unit receiving at least one reference image assigned by the first electronic device, said processing module is programmed to create a data packet based on to-be-conveyed information associated with the service provider, and to link the data packet to the at least one reference image;
    upon said communication unit receiving a captured image from the second electronic device, said processing module is programmed to generate a characteristic code of the captured image according to features of the captured image, and to determine whether there is a match for the captured image among the at least one reference image according to the characteristic code of the captured image; and
    when the determination is affirmative, said processing module is programmed to transmit the data packet, which is linked to the at least one reference image, to the second electronic device via said communication unit;
  wherein:
  the information conveying system further comprises a verification module;
  upon said communication unit receiving a provider certificate from the first electronic device, said verification module is programmed to determine whether the provider certificate from the first electronic device is authentic, and to add the service provider with which the first electronic device is associated to a registered-provider group when it is determined that the provider certificate from the first electronic device is authentic; and
  said communication unit receives the reference image assigned by the first electronic device associated with the service provider that is included in the registered-provider group.

10. The information conveying system of claim 9, wherein the data packet created by said processing unit includes at least one of an image, a video, an animation, a webpage, a text file and a hyperlink.

11. The information conveying system of claim 9, wherein the provider certificate includes an account name and a password specifically associated with the service provider.

12. The information conveying system of claim 9, wherein the to-be-conveyed information is received from the first electronic device.

13. The information conveying system of claim 12, wherein, upon said communication unit receiving update of the to-be-conveyed information from the first electronic device, said processing unit is programmed to update the data packet based on the update of the to-be-conveyed information.

14. The information conveying system of claim 12, which is coupled to a plurality of first electronic devices which are associated with different service providers, respectively,
  wherein, said communication unit receives a plurality of pieces of the to-be-conveyed information from multiple ones of the first electronic devices, and in creating the data packet, said communication unit includes and categorizes the plurality of pieces of the to-be-conveyed information from the multiple ones of the first electronic devices according to types of service provided by the service providers.

15. The information conveying system of claim 9, wherein, in response to receipt of a user certificate from the second electronic device, said processing unit is programmed to enable an online transaction between the user with which the second electronic device is associated and the service provider with which the first electronic device is associated.

16. The information conveying system of claim 9, wherein said processing unit is programmed to control said communication unit to forward a sponsor message, which is provided by the service provider, to the second electronic device.

* * * * *